United States Patent [19]

Shimoiizaka et al.

[11] 4,083,776
[45] Apr. 11, 1978

[54] METHOD AND APPARATUS FOR REMOVING EXTRANEOUS MATTER FROM WASTE GLASS WITH USE OF FLOW OF WATER

[75] Inventors: Junzo Shimoiizaka; Akira Konosu, both of Sendai; Kaneji Morita; Akio Sugie, both of Nishinomiya; Kunio Isioka, Kobe, all of Japan

[73] Assignee: Yamamura Glass Kabushiki Kaisha, Japan

[21] Appl. No.: 755,043

[22] Filed: Dec. 28, 1976

[30] Foreign Application Priority Data

Dec. 29, 1975 Japan .................. 50-158071

[51] Int. Cl.² ............................................ B03B 5/56
[52] U.S. Cl. .................................. 209/452; 209/155
[58] Field of Search .............. 209/155, 157, 444, 436, 209/445, 451, 452, 482

[56] References Cited

U.S. PATENT DOCUMENTS

| 251,828 | 1/1882 | Burr | 209/452 |
|---|---|---|---|
| 1,673,675 | 6/1928 | Hanciau | 209/452 X |
| 2,065,321 | 12/1936 | Morden | 209/452 |
| 2,288,742 | 7/1942 | Ransohoff | 134/65 |
| 2,983,378 | 5/1961 | Hilkemeier | 209/452 X |
| 3,471,014 | 10/1969 | Fuchs | 209/155 |

FOREIGN PATENT DOCUMENTS

| 140,709 | 1/1949 | Australia | 209/445 |
|---|---|---|---|
| 2,530,258 | 3/1976 | Germany | 209/44 |

Primary Examiner—Frank W. Lutter
Assistant Examiner—Ralph J. Hill
Attorney, Agent, or Firm—Holman & Stern

[57] ABSTRACT

Water is supplied to an inclined drum having a helical wall on its inner peripheral surface to cause the water to flow over the helical wall and also on the inner peripheral surface of the drum and to thereby form a flow of water running from the upper end of the drum to its lower end. Waste glass is fed to the drum while the drum is rotated at a high speed. During falling of the waste glass onto the flow of water, during settling of the waste glass in the water flow while it is being sent toward the drum upper end by the helical wall, and while the settled waste glass is maintained by the high-speed rotation of the drum in a suspension-resembling state in which pieces of the waste glass are dispersible and in rocking motion circumferentially of the drum, extraneous matter is forced toward the drum lower end and run off therefrom due to its resistance per unit weight thereof to the flow of water which resistance is greater than that of the waste glass. The waste glass separated from the extraneous matter is discharged from the drum upper end. An apparatus comprises the above-mentioned drum rotatable at a high speed, means for supplying water and means for feeding waste glass. The helical wall of the drum has a height and a pitch which are suitable for producing the flow of water.

7 Claims, 13 Drawing Figures

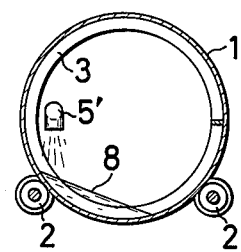
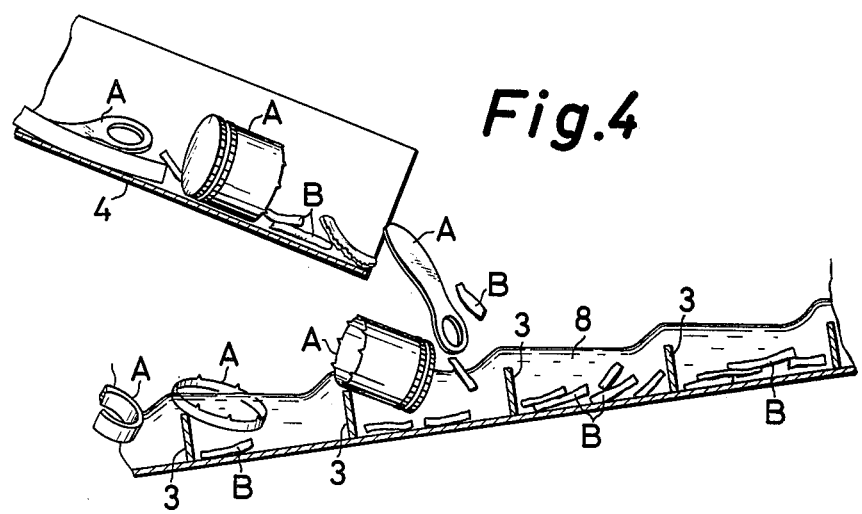
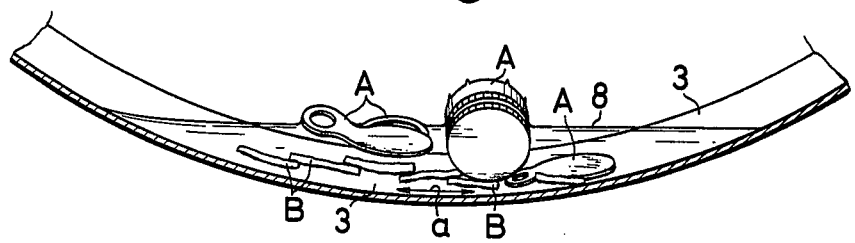

METHOD AND APPARATUS FOR REMOVING EXTRANEOUS MATTER FROM WASTE GLASS WITH USE OF FLOW OF WATER

BACKGROUND OF THE INVENTION

The present invention relates to a method and an apparatus for removing extraneous matter from waste glass for the reuse of the waste glass as cullet.

Collected waste glass contains caps and the like of glass bottles, synthetic resin lids or covers for cup-shaped glass containers, aluminum caps for liquor bottles and aluminum rings separated from the caps. Waste glass may further contain empty cans for beverages. In recent years, many of caps are made of aluminum, while some are made of iron, synthetic resin, cork, etc. Empty cans are generally aluminum and iron cans. When waste glass containing such extraneous matter is used as cullet, the glass product obtained contains bubbles and unmelted substances, i.e. so-called "stones," and involves changes in color or transparency due to the presence of the extraneous matter. These objections reduce the strength and appearance of the product, seriously impairing the commercial value of the product.

Accordingly the extraneous matter must be removed to the greatest possible extent. However, the extraneous matter varies greatly in shape and properties. Moreover, regardless of whether the waste glass has been fractured or not, some kinds of extraneous matter may not differ from the waste glass in shape, size or specific gravity. Thus, with the exception of magnetic materials which are magnetically separable and empty cans which can easily be separated off, the undesirable matter is not readily separable by the conventional method, such as screening or sink and float separation, which separates the extraneous matter from the waste glass based on the differences therebetween in respect of only one of the kind of material, shape, size and specific gravity. In fact, the conventional methods give very low yields. For this reason, very cumbersome procedures are usually followed which involve various kinds of separation methods including the final step of manual separation. However, the manual separation is not fully efficient in removing the extraneous matter which remains to be separated off. Consequently, the waste glass resulting from the separating operation still contains a considerable amount of extraneous matter.

SUMMARY OF THE INVENTION

The main object of this invention is to remove extraneous matter from waste glass efficiently by a single operation to achieve a high rate of removal.

According to this invention, water is supplied to a rotatable drum installed in its inclined position and having a helical wall on its inner peripheral surface for conveying a feed from the lower end of the drum toward its upper end. The water flows over the helical wall and also on the inner peripheral surface of the drum from the upper end to the lower end. Waste glass containing various pieces of extraneous matter including those having greater specific gravities than the waste glass is fed to the drum. The differences in shape, size, specific gravity, etc. between the waste glass and the extraneous matter combine to influence the glass and extraneous matter in the flow of water, producing differences in resistance to the water flow or in settling properties between the glass and extraneous matter. Consequently, the extraneous matter is forced toward the drum lower end by the water flow, while the waste glass is conveyed toward the drum upper end in a stable fashion against the flow of water. During the operation, the drum is rotated at such a speed as to give the waste glass and extraneous matter settled in the water flow a rocking motion circumferentially of the drum, maintaining them in a state resembling suspension. The zone of the flow of water extends to the inner periphery of the drum. Being maintained in the suspension-resembling state, the extraneous matter which tends to settle in the layer of glass is forced toward the drum lower end by the water flow, since the extraneous matter differs from the waste glass in flow resistance and settling rate.

The present invention further provides an apparatus comprising an inclined drum having a helical wall on its inner peripheral surface and rotatable at such a high circumferential speed that the waste glass settled in the flow of water can be maintained in the above-mentioned suspension-resembling state, means for supplying water to the upper end of the drum and means for feeding waste glass to the lower end of the drum. The helical wall has a height and a pitch such that the supplied water will flow over the helical wall, forming a flow zone on and above the inner peripheral surface of the drum.

According to this invention, broken pieces of waste glass containing extraneous matter are fed to the flow of water, in which the differences in material, shape, size and specific gravity between the waste glass and the extraneous matter combine to influence the pieces of glass and of extraneous matter, producing differences therebetween in flow resistance or in settling nature. Since such influence can be effectively given to the pieces settled in the water flow by the action of the flow affording the suspension-resembling state, almost all pieces of extraneous matter are forced toward the lower end by the flow, while the waste glass is almost wholly conveyed by the helical wall in the opposite direction to the movement of the extraneous matter, i.e. against the flow of water. Thus the extraneous matter is efficiently removable. Moreover, the separation can be effected with ease and high efficiency because of the single and continuous operation which is conducted under readily controllable conditions. Furthermore, the flush of water nearly completely removes not only paper, dust, sand and like extraneous matter but also fine pieces of glass which are not usable, giving cullet of excellent quality.

Another object of this invention is to remove extraneous matter with improved efficiency by positively maintaining the extraneous matter in suspension, whereas the extraneous matter tends to settle in a stable fashion. To this end, means for introducing dynamic pressure water is provided within the drum at a position close to one side of the drum where the surface of the water flow is raised by the rotation of the drum, so as to maintain the settled pieces in motion and in suspension by the dynamic pressure water. Alternatively, protrusions may be formed on the inner peripheral surface of the drum between coils of the helical wall or on the side surface of the helical wall to cause settled pieces to jump over the protrusion and to be temporarily held in suspension every time the protrusion passes beneath the bottom of water by virtue of the rotation of the drum. This reduces the stability of the extraneous matter in the water flow, enhancing the likelihood that the extraneous matter will be carried away by the water and ensuring the removal of extraneous matter with improved efficiency and in a higher ratio.

Further according to this invention, the helical wall is inclined toward the direction of flow of the water, whereby the stability of the extraneous matter in the water flow is reduced, affording an improved ratio of removal.

Further according to this invention, the waste glass is fed in the form of a single thin layer or the like to the drum by a chute having a flat plate-like bottom so that the feed will fall onto the water flow in dispersed state. This permits the feed to be subjected to the influence of the water flow uniformly, with the result that the extraneous matter is removable with improved effectiveness.

Other objects and features of this invention will become more apparent from the following description and the accompanying drawings.

BRIEF DESCRIPTION OF THE DRAWINGS

FIG. 3 is a cross sectional view of a drum;

FIGS. 4 and 5 are a fragmentary view in vertical section and a fragmentary view in cross section showing how extraneous matter is separated on an enlarged scale;

DESCRIPTION OF THE PREFERRED EMBODIMENTS

Figure 1:
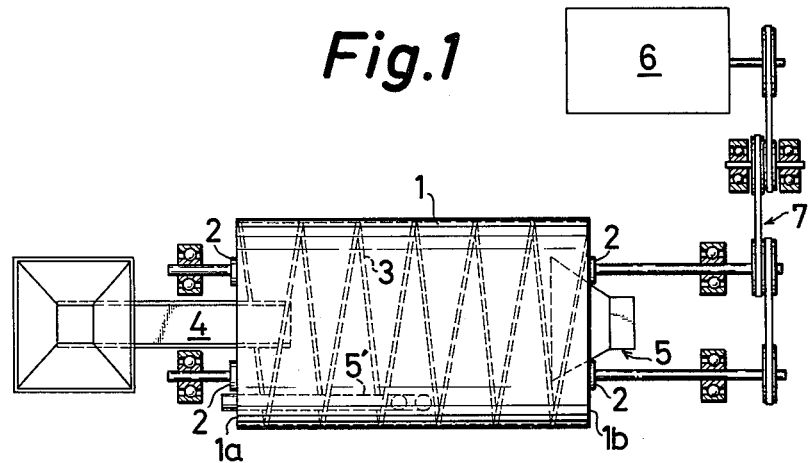
FIG. 1 is a plan view showing an embodiment of the apparatus of this invention.
Figure 2:
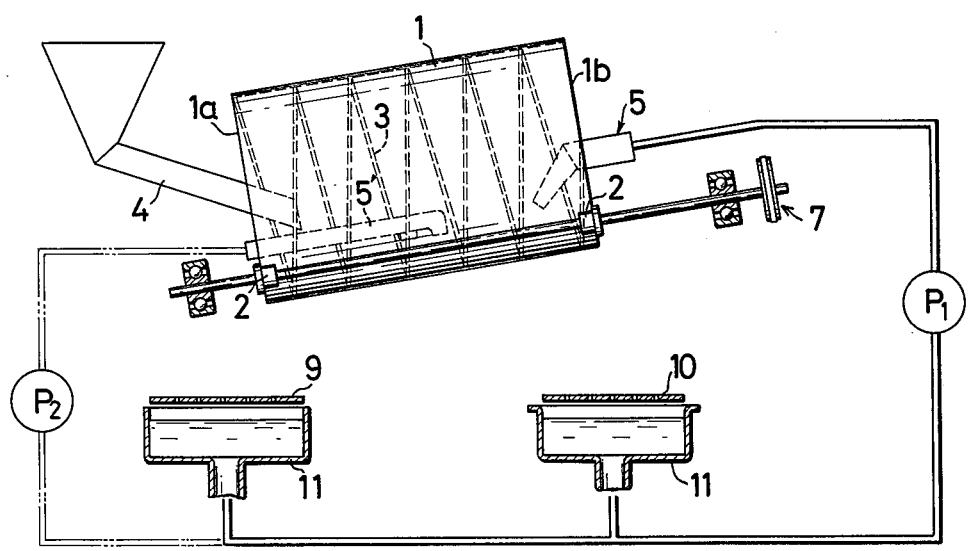
FIG. 2 is a side elevation of the same.

FIGS. 1 to 3 show a preferred embodiment of this invention including a drum 1 installed in its inclined position and rotatably supported by four rollers 2. The drum 1 has a smooth inner peripheral surface on which a helical wall 3 resembling a ribbon screw is formed. When the drum 1 is rotated by the rollers 2, the waste glass fed by a feeder 4 to the lower end 1a of the drum 1 is conveyed by the helical wall 3 from the lower end toward the upper end 1b of the drum. The opposite ends 1a and 1b of the drum are open. The drum 1 is provided with means 5 for supplying water to the drum 1 to form a flow of water running from the upper end 1b to the lower end 1a. The drum 1 is further provided in its interior with a tube 5' for introducing dynamic pressure water by which extraneous matter, which tends to settle on the bottom of the drum 1, is maintained in suspension. The water tube 5' has an outlet which is disposed at a position close to one side of the drum 1 toward which the water surface is raised by the rotation of the drum 1. A drive system 7 for the rollers 2 has a speed change gear 6.

The helical wall 3 in the drum 1 has a height, for example, of 15 to 40 mm. The water supplying means 5 supplies water at a rate capable of forming a flow of water required to force extraneous matter A toward the drum lower end 1a over the coils of the helical wall 3. The drum 1 is rotated at a circumferential speed, for example, of 80 to 300 m/min. Broken waste glass is fed to the drum 1 by a feeder 4. As shown in FIGS. 4 and 5, the waste glass falls onto the water flow 8 along with the extraneous matter A contained therein. The extraneous matter A, which is not brittle, remains unbroken and almost free of deformation even if the waste glass is broken up under gravity during its passage through or from the feeder 4 (by its own energy of impact on falling). Accordingly, pieces of extraneous matter retain their original characteristic shapes; caps and like pieces retain three-dimensional shapes and are very bulky relative to their weight, so that they are readily floatable on the water flow 8 and easy to wash away. Synthetic resin cap covers and like extraneous pieces having a low specific gravity can also be easily washed away with the water flow 8.

On the other hand, flat extraneous pieces A, such as iron caps, aluminium rings, aluminum pull-top pieces having an opening knob and a cutout portion integral with the knob, have a slightly greater tendency to settle than the above-mentioned three-dimensional pieces but are somewhat less likely to settle than broken glass pieces B. Furthermore, such extraneous pieces tend to be caught between glass pieces B, possibly settling onto the inner peripheral surface of the drum 1 along with glass pieces B.

Figure 12:
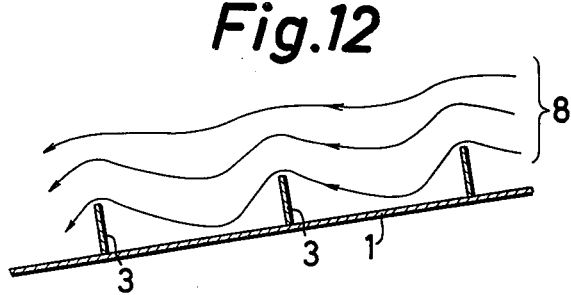
FIGS. 12 and 13 are views illustrating the relation between a flow zone of water and the height and pitch of the helical wall.
Figure 13:
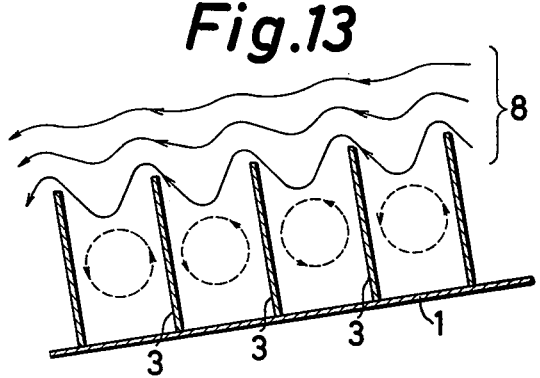

Since the broken glass pieces B are predominantly of planar or similar shape, they tend to face a horizontal stream of water at right angles thereto and encounter a maximum of resistance as the theory of settling indicates. Thus, they may be forced away by the stream to some extent. However, because the glass pieces have a thickness and involve a relatively small fluid resistance per unit weight thereof, they settle much more rapidly than the three-dimensional extraneous pieces, striking the inner peripheral surface of the drum 1 between the coils of the helical wall 3. The helical wall 3 has such height and pitch that the water flowing thereover will involve a zone of water flow reaching the inner peripheral surface of the drum 1 as shown in FIG. 12. In other words, the helical wall 3 is designed to permit the water to flow thereover and also on the inner peripheral surface of the drum 1 as if river water flows on the bottom of the river while scraping the bottom. A comparison between FIG. 12 and FIG. 13 reveals that if the helical wall 3 has a high height/pitch ratio as illustrated in FIG. 13, the helical wall 3 acts as a baffle plate for the flow of water, producing stagnation on the inner peripheral surface of the drum and seriously hindering the efficient separation contemplated by the invention. More specifically, if the height/pitch ratio of the helical wall 3 is great, the pieces settling at a deep portion of the water flow between the coils of the wall 3 are less subjected to the force of the water flow and tend to form a deposition on the bottom. Consequently, hardly any separation is effected during the transport of glass pieces by the helical wall 3. This will be apparent from a comparison between Example 2 and Example 4 of the experiments given later. When the helical pitch is 100 mm and the height of the helical wall is increased from 30 mm to 50 mm, an extremely reduced rate of removal of extraneous matter results, despite an increase in the angle of inclination of the drum and an increase in the rate of supply of water. In view of the fact that a considerable amount of extraneous matter is removed while the waste glass falls onto the surface of water and also while the waste glass descends from the surface of water to the level of the edge of the helical wall, the 50-mm-high helical wall presumably fails to achieve effective separation while the waste glass descends from the level of edge of the wall 3 to the base portion of the wall 3 and while the glass is transported by the helical wall 3. In accordance with this invention, the lower limit of the pitch of the helix is dependent on the size of the pieces to be separated so as to avoid tight or fitting engagement of the pieces in the space between the coils of the helical wall 3, whereas there is an upper limit for the pitch because of the limitation on the helical angle (the tangent of the helical angle equals the pitch divided by the circumference) of the wall 3 which ensures transport of the waste glass toward the drum upper end. Thus, the pitch is limited to a predetermined range for practical operation.

The broken glass pieces B and other pieces striking and settled on the inner peripheral surface of the drum 1 between the coils of the wall 3 are subjected to the force of the water flow acting in the direction of the flow and, at the same time, to the influence of the motion of the peripheral wall of the drum 1 which is driven at a high circumferential speed.

The behavior of broken glass pieces B positioned between the coils of the helical wall 3 alters with the circumferential speed of the drum 1.

It has been found that if the circumferential speed of the drum 1 is low, for example, 45 m/min, the glass pieces B and other pieces travel with the inner peripheral surface of the drum due to the frictional contact therewith and conveyed by the helical wall 3 as raised close to the surface of water.

It has also been found that when the circumferential speed of the drum 1 is high, for example, 80 to 300 m/min, the glass pieces B and other pieces at the bottom of water flow 8 are maintained in a state resembling suspension and involving a small reciprocal rocking motion in the circumferential directions as indicated in the arrow $a$ in FIG. 5.

The suspension-resembling state is similar to a state of aircraft in which it bounces on the ground when landing. The glass pieces B in the water behave similarly above the inner peripheral surface of the drum 1. In the suspension-resembling state, the glass piece B or the like above the drum bottom is in its most stable posture if the center of gravity thereof is at the lowest position i.e. if the piece is positioned approximately parallel to the bottom of the drum. In such position, the piece encounters the smallest resistance to the flow of water 8. Thus, the glass pieces B and the like in the suspension-resembling state, in which they undergo a rocking motion in a posture parallel to the water flow 8 and involve the least resistance to the flow, are highly dispersible and are transported from the drum lower end 1a to the upper end 1b. During the transport, the extraneous matter A contained in the glass B as caught therebetween are separated from the glass pieces B.

The separation is carried out in the state in which the glass pieces and other pieces are highly dispersible, utilizing the properties of the flat extraneous matter A that they have a greater specific surface area and greater resistance to the water flow per unit weight than glass pieces B.

This will be apparent from the results of experiments, more particularly from a comparison between Example 2 and 3 in which operation was conducted under the same conditions with the exception of the circumferential speed of the drum. It is noted that when the number of revolutions of the drum is reduced from 100 r.p.m. (circumferential speed: about 160 m/min) to 30 r.p.m. (circumferential speed: about 50 m/min), the rate of removal of the extraneous matter greatly decreases. Incidentally, like Example 4, Example 3 in which the circumferential speed is low reveals that efficient separation is not attainable during transport by the helical wall.

The extraneous matter A in the waste glass B is washed away by the water flow 8 toward the drum lower end 1a and is run off from that end, while the waste glass B is transported by the helical wall 3 toward the drum upper end 1b against the flow of water 8 and is discharged from the upper end 1b.

FIG. 2 shows conveyors 9 and 10 for receiving the extraneous matter A and waste glass B thus discharged. The conveyors are in the form of a liquid permeable belt and are provided with water receptacles 11 thereunder. The water supplying means 5 and water tube 5' are provided with pumps $P_1$ and $P_2$ for circulating water.

We conducted experiments using an apparatus as illustrated in FIGS. 1 and 2 under the conditions given below. However, the water tube 5' for supplying dynamic pressure water for positively suspending the extraneous matter was not used.

| | |
|---|---|
| a. Test material: | 60 kg of waste glass having sizes of −40 to +5 mm and containing pieces of extraneous matter. |
| The extraneous matter: | Pull-top pieces 50 pieces, 35 g |
| | Al rings 50 pieces, 20 g |
| | Caps 20 pieces, 75 g |
| | Al caps 20 pieces, 40 g |
| | Synthetic resin Caps 20 pieces, 60 g |
| | Corks 5 pieces, 20 g (250 g (0.42 wt.%) in total) |
| b. Diameter of drum: | 300, 500 mm |
| c. Rotation of drum: | 180, 150, 120, 100, 60, 30, r.p.m. |
| d. Inclination of drum: | 8.0°, 9.6°, 10.4°, 11.2°, 13.7° |
| e. Helical wall | |
| Height: | 15, 30, 50 mm |
| Pitch: | 60, 100 mm |
| Angle of inclination: | 90° |
| f. Rate of treatment: | 300, 500, 900, 1200, 1500, 2000 kg/hr |
| g. Rate of supply of water: | 60, 100, 150, 200, 240, 280 l/min |

The results of the experiments show the following:

a. With increasing number of revolutions of the drum, R.C. (ratio of concentration: the ratio of the amount of ore fed (i.e. the amount of waste glass containing extraneous matter) to the amount of concentrate) decreases but the ratio of removal of the extraneous matter slightly lowers. High ratios of removal are attainable by increasing the flow rate of water or by increasing the angle of inclination of the drum. This, however, is slightly unfavorable to R.C.

b. Increases in the angle of inclination of the drum and in the rate of supply of water increase the ratio of removal of the extraneous matter but conversely impair R.C. to some extent.

c. When the height of the helical wall exceeds 50 mm, R.C. somewhat improves but the ratio of removal greatly decreases.

The foregoing experiments were conducted with the following combinations of conditions, giving the following results.

|  | Example | | | |
|---|---|---|---|---|
|  | 1 | 2 | 3 | 4 |
| Drum |  |  |  |  |
| Diameter (mm) | 500 | 500 | 500 | 500 |
| Length (mm) | 1100 | 1100 | 1100 | 1100 |
| Inclination angle (degree) | 9.6 | 8.0 | 8.0 | 10.4 |
| Rotation (r.p.m.) (speed, m/min) | 120 (about 190) | 100 (about 160) | 30 (about 50) | 100 (about 160) |
| Helical wall |  |  |  |  |
| Height (mm) | 30 | 30 | 30 | 50 |
| Pitch (mm) | 100 | 100 | 100 | 100 |
| Helical angle (degree) | about 3.5 | about 3.5 | about 3.5 | about 3.5 |
| Inclination angle $\theta$ (degree) | 90 | 90 | 90 | 90 |
| Rate of treatment (kg/hr) | 2000 | 1200 | 1200 | 1200 |
| Amount of water used (l/min) | 240 | 200 | 200 | 280 |
| (Amount of water/ amount of waste glass, m³/t) | (7.2) | (10) | (10) | (14) |
| Rate of removal of extraneous matter (%) | 92 | 90 | 54 | 51 |
| R.C. | 1.10 | 1.03 | 1.13 | 1.02 |

The results of the experiments show that the broken waste glass is hardly affected by the water flow 8 but can be recovered by being conveyed by the helical wall 3 in a direction reverse to the direction of the water flow 8.

Figure 6:
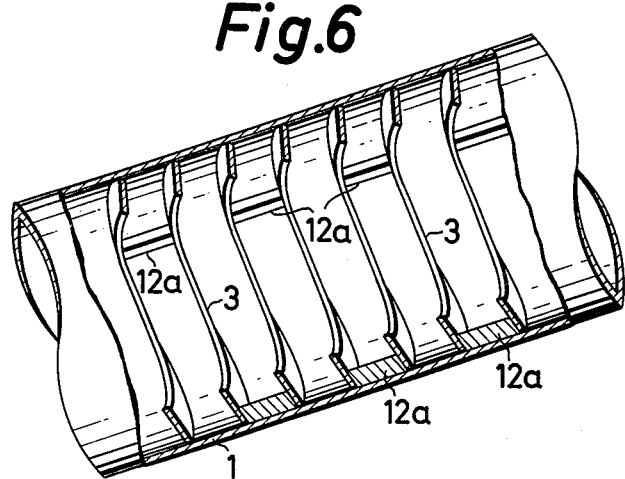
FIG. 6 is a side elevation partly in section showing an embodiment in which protrusions are formed on the inner peripheral surface of the drum.
Figure 7:
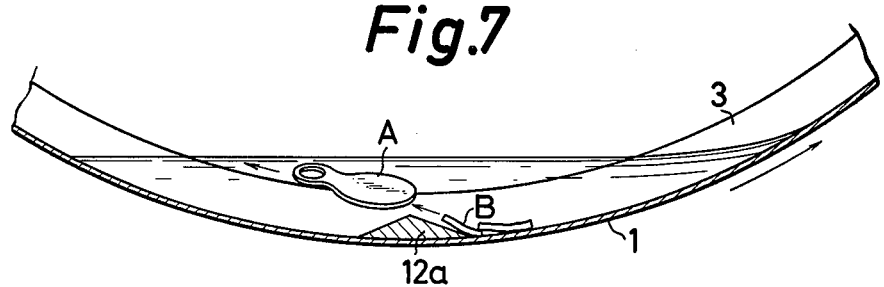
FIG. 7 is a fragmentary cross sectional view on an enlarged scale showing a settled piece as it is caused to jump over the protrusion.
Figure 8:
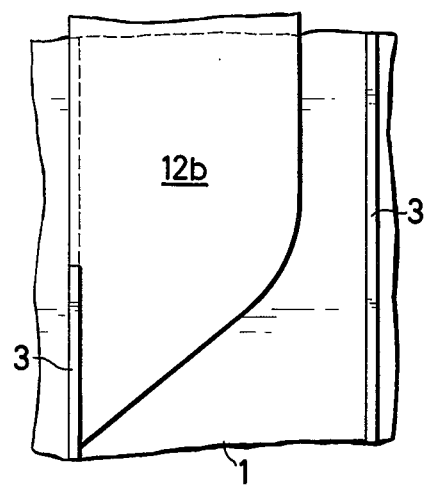
FIGS. 8 and 9 are a fragmentary plan view and a fragmentary sectional view on an enlarged scale showing an embodiment in which a protrusion is formed on the side surface of a helical wall.
Figure 9:
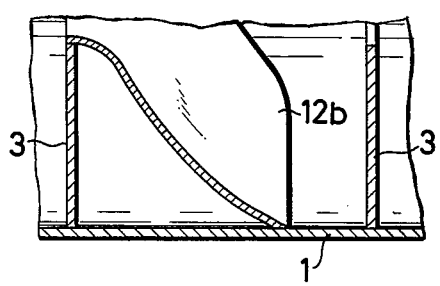

Further when dynamic pressue water is supplied from the water tube 5', the extraneous matter A which tends to settle on the bottom of the drum 1 is positively held in suspension, with the result that the extraneous matter is forced toward the drum lower end 1a more efficiently and is removable in a greater ratio. The inner peripheral surface of the drum 1 may be formed with protrusions 12a as seen in FIGS. 6 and 7, or the helical wall 3 may be formed on its side surface with protrusions 12b as shown in FIGS. 8 and 9. Because these protrusions 12a and 12b pass across the water flow 8 due to the rotation of the drum 1, the waste glass B and extraneous matter A in the suspension-resembling state during transport are caused to periodically jump and thereby held in suspension without settling. The protrusions therefore aid the extraneous matter A in travelling toward the drum lower end 1a on the water flow 8, whereby an increased ratio of removal is attainable almost without adversely affecting the R.C.

Figure 10:
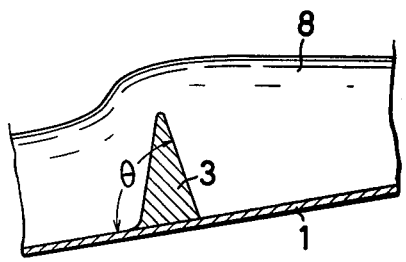
FIG. 10 is an enlarged view in section showing an embodiment including an inclined helical wall.

FIG. 10 shows the helical wall 3 inclined at an angle of $\theta$. The inclination also facilitates the travel of the extraneous matter A toward the drum lower end 1a, increasing the ratio of removal of the extraneous matter while slightly adversely affecting the R.C.

Experiments were conducted using a drum 1 formed with the protrusions 12a on its inner peripheral surface, another drum 1 formed with the protrusions 12b on the side surface of the helical wall 3, and another drum 1 including a helical wall having a height of 25 mm and an angle of inclination of 70°. The other conditions were as follows. The rotation of the drum was 120 r.p.m.; angle of inclination of the drum, 11.2°; rate of treatment, 2000 kg/hr; and rate of supply of water, 240 l/min. As compared with the results obtained by the first-mentioned experiments conducted under similar conditions, the ratio of removal of extraneous matter was several percent higher and the R.C. was greater by about 0.01.

Figure 11:
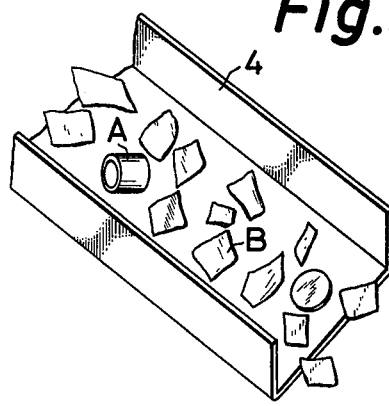
FIG. 11 is a perspective view showing a mode of feeding waste glass.

Further when the feeder 4 has a planar bottom 4a as seen in FIG. 11 and is so disposed as to feed the waste glass to the water flow 8 in the form of a single layer or thin layer, the waste glass B and extraneous matter A can be fed in a loose state free of overlapping. Then, the extraneous matter A will not be fed to the water flow 8 in such a state that the extraneous pieces are positioned under the glass pieces B. Consequently, a major portion of the extraneous pieces can be effectively washed away and separated from the glass pieces B when fed to the water flow 8. An improved ratio of removal will therefore result. In order to feed the waste glass in the form of a thin layer, the feeder 4 may be oscillated.

Our experiments have revealed that the preferred conditions are in the following ranges:

a. Speed of rotation of the drum: 80 to 300 m/min.
b. Rate of water supply: 4.5 to 12 m³ per ton of waste glass.
c. Angle of inclination of drum: 8° to 12°.
d. Helical angle of helical wall: 2° to 4°.
e. Height of helical wall: 15 to 40 mm.
f. Angle of inclination of helical wall: 60° to 80°.

For practical purposes, the drum may preferably have a diameter of about 500 to 1000 mm, in which case the treating capacity is about 1.0 to 3.5 tons/hr. The treating capacity will increase to about 1.5 times the above-mentioned value with use of two helical walls 3 having a helical angle of about 4° to 7°. Preferably, the waste glass has sizes of about −40 mm. It has also been found that the helical wall produces a greater stirring action on the extraneous matter A and gives a higher ratio of removal with the increase in the helical angle. Good results may also be attainable under conditions other than the foregoing, if proper conditions are selected in proper combination.

What is claimed is:

1. A method of removing extraneous matter from a mixture of extraneous matter and waste glass, said extraneous matter having a greater specific surface area and greater resistance to the water flow per unit weight than said waste glass comprising providing an inclined drum having an upper end, a lower end, an inner peripheral surface and a helical wall on said inner peripheral surface, said helical wall being inclined towards the lower end of the drum, introducing water to the drum at said upper end to provide a flow of water running in a substantially axial direction down the interior of the drum over said helical wall, said wall having a depth and pitch to produce a water flow zone substantially reaching said inner peripheral surface, feeding waste glass mixed with extraneous matter into the drum to drop into said flow of water, rotating the drum at a speed to bring the waste glass into a dispensible suspension-resembling state in the water flow with a rocking motion imparted to the glass circumferentially of the drum to cause the waste glass in said suspension-resembling state to be moved toward said upper end of the drum by said helical wall and the extraneous matter to be moved toward said lower end of the drum in said flow of water whilst periodically causing the waste glass and extraneous matter to encounter disruptions in their movements, and discharging the waste glass from the upper end of the drum and the separated extraneous matter from the lower end of the drum.

2. The method of claim 1 wherein the drum has a diameter of from 500 to 1000 mm, and an angle of inclination of between 8° and 12° to the horizontal, said helical wall is inclined at an angle of between 60° and 80° towards the lower end of the drum, has a height of from 15 to 40 mm and a helix angle of from 2° to 4°, the water is supplied at a rate of between 4.5 to 12 m³ per ton of waste glass supplied to the drum and the speed of rotation of the drum is from 80 to 300 m/minute.

3. The method of claim 1 wherein the mixture of waste glass and extraneous matter is introduced into the drum in the form of a substantially flat sheet.

4. Apparatus for removing extraneous matter from a mixture of extraneous matter and waste glass comprising a drum having a diameter of from 500 to 1000 mm and comprising an upper end, a lower end, an inner peripheral surface and a helical wall on said inner peripheral surface inclined towards said lower end of the drum at an inclination of from 60° to 80°, said helical wall having a height of from 15 to 40 mm and a helix angle of from 2° to 4°, means mounting said drum at an angle of inclination of from 8° to 12° to the horizontal, means for introducing water to said drum at said upper end to provide a flow of water running in a substantially axial direction down the interior of the drum over said helical wall, means for supplying waste glass mixed with extraneous matter into the drum to drop into said flow of water, means for rotating the drum at a speed of from 80 to 300 m/min, to cause the waste glass to be moved toward the upper end of the drum by said helical wall and said extraneous matter to be moved toward the lower end of the drum in said flow of water, and protrusions formed on interior parts of the drum to cause the waste glass and extraneous matter to encounter periodic disruptions in their movements.

5. The apparatus of claim 4 wherein said protrusions are formed on said inner peripheral surface.

6. The apparatus of claim 4 wherein said protrusions are formed on said helical wall.

7. The apparatus of claim 4 including means for introducing a further flow of dynamic pressure water into the drum.

* * * * *